US005915108A

United States Patent [19]

Frey et al.

[11] Patent Number: 5,915,108

[45] Date of Patent: Jun. 22, 1999

[54] METHOD OF MEASUREMENT AND COMPENSATION OF AN INACCURATE CLOCK SIGNAL

[75] Inventors: Michael James Frey; R. Brooks Reed, both of Noblesville, Ind.; Charles Stuart Tosch, Fenton, Mich.

[73] Assignee: Delco Electronics Corporation, Kokomo, Ind.

[21] Appl. No.: 08/885,408

[22] Filed: Jun. 30, 1997

[51] Int. Cl.[6] .......... G06F 1/04

[52] U.S. Cl. .......... 395/555; 395/558

[58] Field of Search .......... 395/555, 558; 702/75, 78, 89

[56] References Cited

U.S. PATENT DOCUMENTS 4,616,173 10/1986 Cook et al. .......... 324/78 D
4,945,303 7/1990 Hwang et al. .......... 324/78 D
5,745,534 4/1998 DeBiasi et al. .......... 375/354

*Primary Examiner*—Dennis M. Butler
*Attorney, Agent, or Firm*—Jimmy L. Funke

[57] ABSTRACT

A method for determining the actual frequency of an inaccurate clock signal then using the actual frequency to generate a compensation factor to correct calculations using the clock signal. The method includes counting the number of clock pulses in the clock signal over a predetermined and programmable period of time, and based on the clock pulse count, determining the actual frequency of the clock signal. Once the actual frequency of the clock signal is determined, this value is used to generate the compensation factor based on the expected or rated frequency of the clock signal to compensate for the calculations using the clock signal. The method has a particular application for use in a powertrain control module incorporating a low frequency resonator and a high frequency system clock, where the resonator generates an inaccurate clock signal which is highly stable for short periods of time and the system clock is relatively stable over long term but suffers from short term jitter.

18 Claims, 2 Drawing Sheets

METHOD OF MEASUREMENT AND COMPENSATION OF AN INACCURATE CLOCK SIGNAL

BACKGROUND OF THE INVENTION

1. Field of the Invention

This invention relates generally to a method of determining the frequency of a clock signal, and, more particularly, to a method of first determining the actual frequency of an inaccurate clock signal by counting the number of clock pulses of the clock signal during a specified amount of time and then determining a compensation factor based on the actual frequency to be used as a correction of the rated frequency of the clock signal for a particular digital circuit timing application.

2. Discussion of the Related Art

As is well understood, all digital circuits use one or more clock signals for digital logic timing purposes. These clock signals can be generated by different types of devices, such as various crystals, resonators, etc. The different clock signal generating devices can provide a wide range of different clock signal frequencies at varying degrees of accuracy. The accuracy of the clock signal is determined by the ability of the device to generate a particular frequency at any particular time within a certain percent error. Depending on the particular clock signal source, temperature, age, etc. have an effect on its output frequency and accuracy. Clock signal generating devices that are more accurate and maintain their accuracy over time at varying temperatures are generally more expensive.

A powertrain control module (PCM) incorporating digital logic circuitry is provided in modern day vehicles having internal combustion engines to control the operation of the engine and transmission functions of the vehicle. The PCM controls the timing of the application of fuel and ignition spark to the various cylinders of the engine to provide spark dwell and placement and fuel pulse-width and placement. Additionally, the timing signal provides communication protocol bit timing. To generate the timing signals necessary to provide this control, the PCM utilizes a high frequency system clock (having a frequency, for example, of 20 MHZ) and a low frequency control clock (having a frequency, for example, of 2 MHZ). The high frequency system clock is often a low-frequency crystal (for example 32 KHz) which is multiplied to a much higher frequency within the CPU. The low frequency control clock is typically a resonator in this type of application. The relatively fast system clock is necessary to meet the high data rate demands for processing the lines of microcode in the PCM, and the slower control clock is necessary to provide appropriate timing for the output signals for the fuel and ignition sparks.

The currently used high frequency system clock has a long term frequency that is generally predictable and stable (±0.1%) over temperature and age, but has short term "jitter" that can make one pulse width significantly vary from another pulse width or from its expected pulse width. This jitter is caused by the multiplying of the low frequency crystal within the CPU. The lower frequency control clock typically does not have short term jitter, but has a relatively high long term error (±2.0%), and thus has significant drift as a result of age and temperature variances. The relatively inaccurate control clock signal is acceptable for misfire detection, but is unacceptable for other purposes, such as force motor pulse-width modulation. Additionally, the jitter on the high frequency system clock signal could make the fuel and ignition control signals inaccurate leading to higher emissions and/or lower fuel economy and failures to comply with requirements.

FIG. 1 shows a series of clock signals on lines A–F that illustrate the signals discussed above. Line A represents a high frequency system clock signal having a certain period, where the long term average frequency of the system clock signal is highly accurate, but short term jitter makes the individual pulses inaccurate relative to each other. Line B represents a low frequency control clock signal where the individual clock pulses are stable relative to each other, but the long term clock frequency may be relatively inaccurate. Line C shows an output control signal having a desired pulse width, that is used for example to provide fuel and ignition spark timing in an internal combustion engine. Because of the jitter in the system clock signal, the actual clock pulse width of the output signal generated from the system clock signal could fall at a number of locations, as represented by the output signal in line D. This makes the system clock not practical to be used as a timing signal for the output signals that control fuel and ignition sparks on some applications with higher resolution and accuracy requirements.

The currently existing resonators that generate the control clock signals in a PCM have been inexpensive resonators, and their long term accuracy, as discussed above, has effected the accuracy of the fuel and ignition control output signals. To illustrate this, line E represents an output control signal that is based on a control clock signal that has too high of a frequency, and line F represents an output signal that is based on a control clock signal that has too low of a frequency for the desired output signal. With the new requirements and clock jitter, there is a significant margin of error at which the ignition and spark are applied to the cylinders in the prior art PCMs.

Industry standards establish the accuracy of the control clock signal to provide the precision of when the fuel and ignition signals are applied. As the sophistication and performance requirements of modern vehicles increases, the accuracy at which the fuel and ignition spark are controlled becomes more critical, and thus the accuracy of the control clock becomes increasingly more important. More accurate resonators can be provided in the PCM to generate more accurate control clock signals or the resonator can be replaced with crystals, however, these resonators and crystals become increasingly more expensive as their accuracy increases.

What is needed is a technique for determining the frequency of a relatively inaccurate clock signal, and providing compensation of the clock signal once it is determined, so as to eliminate the need for a more accurate clock generating device. It is therefore an object of the present invention to provide such a technique.

SUMMARY OF THE INVENTION

In accordance with the teachings of the present invention, a method is disclosed for determining the actual frequency of an inaccurate clock signal and using the actual frequency to generate a compensation factor to correct calculations using the clock signal. This method uses software thereby eliminating additional hardware and cost. The method includes counting the number of clock pulses in the clock signal over a predetermined and programmable period of time, and based on the clock pulse count, determining the actual frequency of the clock signal. Once the actual frequency of the clock signal is determined, this value is used to generate the compensation factor based on the expected or rated frequency of the clock signal to compensate for the calculations using the clock signal. Alternately, the actual frequency of the clock signal can be used in the calculations without the need to calculate the compensation factor.

The method has a particular application for use in a powertrain control module incorporating a low frequency resonator and a high frequency system clock, where the resonator generates an inaccurate clock signal which is highly stable for short periods of time and the system clock is relatively stable over long term, but suffers from short term jitter. Time capture registers are used to provide a count of the resonator clock signal and 12 the system clock signal. The frequency of the resonator clock signal is determined over a time period established in terms of the system clock signal. Using this method, the relatively inexpensive low frequency resonator can be maintained to provide certain timing signals such as spark dwell and placement and fuel pulse-width and placement.

Additional objects, advantages and features of the present invention will become apparent from the following description and appended claims, taken in conjunction with the accompanying drawings.

DETAILED DESCRIPTION OF THE PREFERRED EMBODIMENTS

The following description of the preferred embodiments directed to a method of determining the actual frequency of a relatively inaccurate clock signal, and then determining a compensation factor based on the error between the measured clock signal and the rated clock signal, is merely exemplary in nature and is in no way intended to limit the invention or its applications or uses. In particular, the following discussion is directed to a method of measuring and compensating for a low frequency resonator clock signal associated with a powertrain control module that is used to provide ignition and fuel signals in an internal combustion engine. However, the method of the invention has much broader applications in measuring and compensating for any inaccurate clock signal for a digital circuit application.

Figure 1:
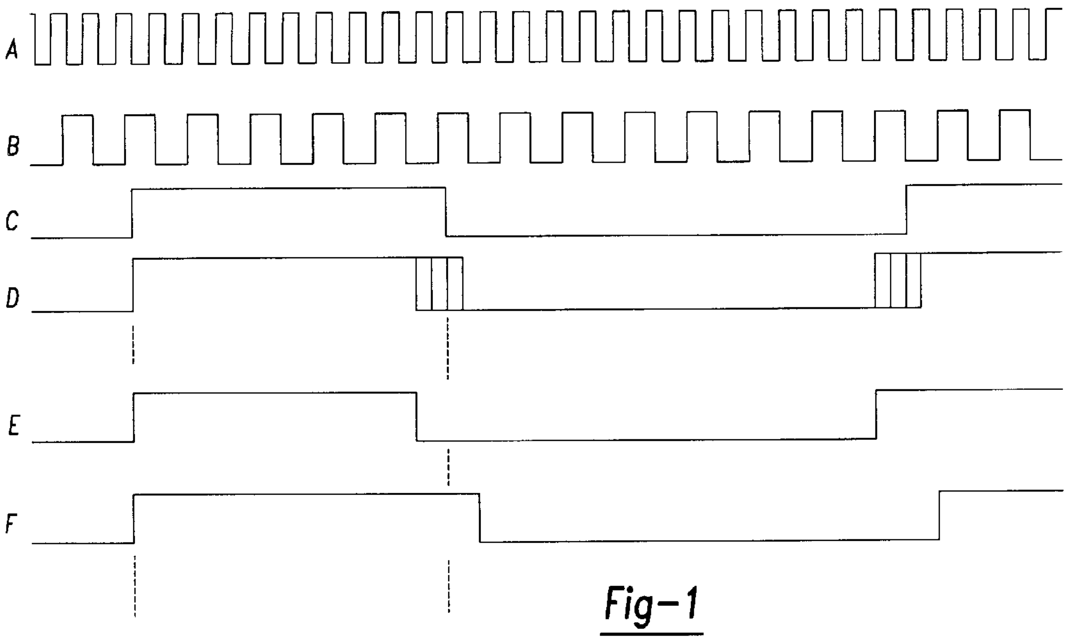
FIG. 1 shows a series of clock signals for a system clock, a control clock, and an output timing signal to represent the advantages of the present invention.
Figure 2:
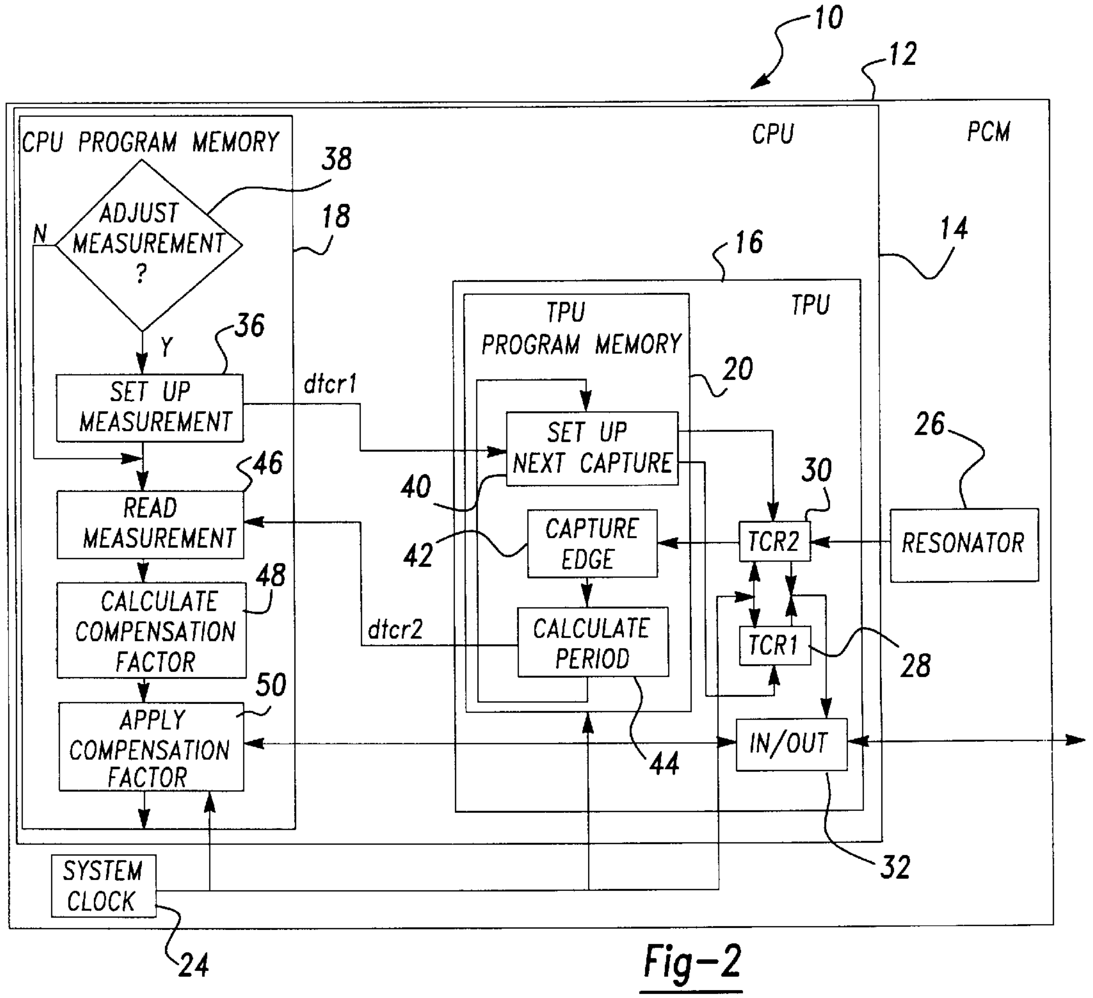
FIG. 2 is a block diagram of a powertrain control module incorporating firmware for measuring and compensating for an inaccurate clock signal, according to an embodiment of the present invention.

FIG. 2 depicts a system 10 incorporating a technique of measuring an inaccurate clock signal and generating a compensation factor based on the measured clock signal, according to an embodiment of the present invention. The system 10 includes a powertrain control module (PCM) 12 representative of the type used in modern day vehicles to control the operation of the engine and transmission functions of the vehicle, as is well understood in the art. The PCM 12 incorporates digital logic circuitry including a central processing unit (CPU) 14 that provides the processing within the PCM 12. Any known CPU suitable for the present invention can be used as would be understood to those skilled in the art.

A subpart of the CPU 14 is a time processor unit (TPU) 16 that provides processing for timing operations of the various functions of the CPU 14. The CPU 14 also includes a CPU program memory 18 that stores the various data and code used in the operation of the CPU 14. The program memory 18 can be any microprocessor memory suitable for the purposes of the present invention, and includes any of the known types of memory, such as a read only memory (ROM), an erasable programmable read only memory (EPROM), an electrically erasable programmable read only memory (EEPROM), a flash random access memory (RAM), and RAM, or any combination thereof, all well known to those skilled in the art. Likewise, the TPU 16 includes a TPU program memory 20 that can be any suitable memory for the purposes of the present invention, and can be any of the memories discussed above. It is well within the scope of the present invention that the CPU program memory 18 and the TPU program memory 20 can be combined in the PCM 12 as a single memory.

A system clock generating device 24, usually a crystal, is included in the PCM 12 to provide a high frequency system clock signal, and a resonator 26 is included in the PCM 12 to generate a low frequency control clock signal for the purposes discussed above. The system clock generating device 24 and the resonator 26 can be any suitable device known in the art to provide the desirable frequency clock signal at a given nominal accuracy.

The TPU 16 also includes a first time capture register (TCR) 28, labeled TCR1, and a second TCR 30, labeled TCR2. As is well understood in the art, a TCR is a register that receives a clock or timing signal, and increments every certain number of pulses to store a count based on the clock signal. The TCR 28 receives the system clock signal from the device 24 to provide a time count of the system clock signal. The TCR 30 receives the resonator clock signal from the resonator 26 and the system clock signal from the device 24 and provides a time count every predetermined number of resonator clock cycles. The TCR 28 and the TCR 30 provide a count at either the rising edge or the falling edge of the clock signal. Because the edges of the resonator clock signal and system clock signal usually will not coincide, synchronization is provided by the TPU 16 between the TCRs 28 and 30. In one example, the system clock signal may be 16.7 MHZ, and the TCR 28 may divide this frequency down by 16 to obtain a 1.048 MHZ clock signal at the output of the TCR 28. Further, the resonator 26 may generate a 2 MHZ clock signal, and the TCR 28 may divide this signal by two to generate a 1 MHZ clock signal.

Additionally, the TPU 16 includes an input/output channel 32, intended to represent one of many (for example sixteen) input/output channels of the TPU 16, that provides the input and output signals to and from the CPU 14, such as the input signal from an external sensor (not shown) or an output signal that is the control signal to apply the fuel and spark signals to the vehicle. The architecture of the PCM 12 as discussed so far is conventional in the art, and the operation of these systems to control vehicle engine and transmission functions is well understood.

The resonator 26 can be relatively inaccurate (2% of nominal), and thus inexpensive, to reduce or maintain the costs of the PCM 12. In accordance with the teachings of the present invention, an algorithm is provided within the firmware of the CPU 14 where the frequency of the inaccurate clock signal from the resonator 26 is first measured, and then a compensation factor is determined based on the actual frequency of the clock signal and the rated frequency of the clock signal to provide the desirable pulse width of the input and output signals from the CPU 14, such as from the input/output channel 32.

To illustrate the present invention, FIG. 2 depicts flow chart diagram boxes within both the program memories 18 and 20 to represent the various operations within the microcode and software of the CPU 14 associated with the invention. The CPU 14 determines the actual frequency of the clock signal from the resonator 26, as represented in the TCR 30, over a predetermined and programmable time period. In the specific example being discussed herein, a value dtcr1 is the programmable time period that the frequency of the resonator clock signal is measured over, and a value dtcr2 is the actual period (frequency) of the resonator clock signal over that time. The frequency of the resonator clock signal is continually determined for each consecutive dtcr1 time period so that as the resonator clock signal drifts, the actual frequency of the resonator clock signal can be updated.

During an initialization sequence of the various memories and registers within the CPU 14, the time period of the dtcr1 value is set by the algorithm and is stored at a set up measurement box 36. During the operation, the dtcr1 value may be changed for a variety of reasons. The algorithm determines if the dtcr1 value is to be changed at a decision diamond 38, and if so, then a new dtcr1 value is stored at the set up measurement box 36. If the dtcr1 value remains constant, as is usually the case, then the decision diamond 38 bypasses the set of measurement box 36, as shown.

The TPU 16, like most digital timer units, includes special hardware for generating an event based on some time value and special hardware for capturing certain input information, like edge times in relation to a time register. In the current operation, the TPU 16 is instructed by the algorithm to generate an event after an amount of time corresponding to the dtcr1 value has expired. The dtcr1 value stored at the set up measurement box 36 is written to the TPU memory 20 in terms of the system clock and is applied to a set up next capture box 40, as shown. The algorithm applies a signal from the set up next capture box 40 to the TCR 30 to cause the TCR 30 to increment every certain number of cycles of the clock signal from the resonator 26. The algorithm also applies a signal to the TCR 28 to cause it to indicate to the TPU 16 when the amount of time dtcr1 has elapsed. For example, the TCR 30 may provide a count at each rising edge or falling edge of the clock signal for a one-to-one count per clock cycle. Alternately, the TCR 30 may provide a count every two clock cycles to divide the frequency of the resonator clock signal in half.

When the TPU 16 indicates that the time of the dtcr1 value has elapsed, the algorithm applies a signal to the TCR 30 to cause the count value stored in the TCR 30 to be applied to a capture edge box 42 where the algorithm determines the number of counts stored in the TCR 30 during the last dtcr1 time period. Thus, at box 42, the algorithm receives edge information of the clock signal over a certain time period. Every time the dtcr1 time period expires, the count signal from the TCR 30 is applied to the capture edge box 42 to provide an indication of the count value currently stored in the TCR 30 or the period of the resonator 26. In this operation, the TPU 16 will record the edge time and edge count data in terms of the value from the TCR 30 when the event from the TCR 28 occurs.

The algorithm determines the period of the resonator clock signal over each dtcr1 period when the edge of the resonator clock signal is captured, as represented by a calculate period box 44, which is the value dtcr2. This period value is essentially the measured frequency of the clock signal from the resonator 26. The algorithm also sends a signal from the calculate period box 44 to the set up next capture box 40 to cause the algorithm to provide a signal to the TCR 28 to cause it to indicate to the TPU 16 when the next dtcr1 period has elapsed. Each time the TCR 30 sends the count signal when the dtcr1 time period elapses, the algorithm determines the period of the clock signal from that count value.

The algorithm applies the dtcr2 value from the calculate period box 44 to the CPU memory 18 at a read measurement box 46. The algorithm determines the dtcr2 value or the clock frequency at the read measurement box 46 and applies this value to a calculate compensation factor box 48. Based on the dtcr1 and dtcr2 values, the algorithm calculates a compensation factor. The compensation factor is the factor representing the difference between the rated clock frequency of the resonator 26 and the actual measured clock frequency. The algorithm applies this compensation factor to the appropriate lines of code within the CPU 14 at an apply compensation box 50 to accurately generate the corrected signals at the input/output channel 32, as well as the other input/output channels. The compensation factor is applied to all calculations involving timing output or timing input which is based upon the clock signal from the resonator 26. For example, these calculations would include, but are not limited to, spark dwell and placement, fuel pulse-width and placement, and communication protocol bit timing. Alternately, instead of generating a compensation factor, the CPU 14 can use the actual measured frequency of the clock signal from the resonator 26 in the various calculations that use the clock frequency signal from the resonator 26.

Figure 3:
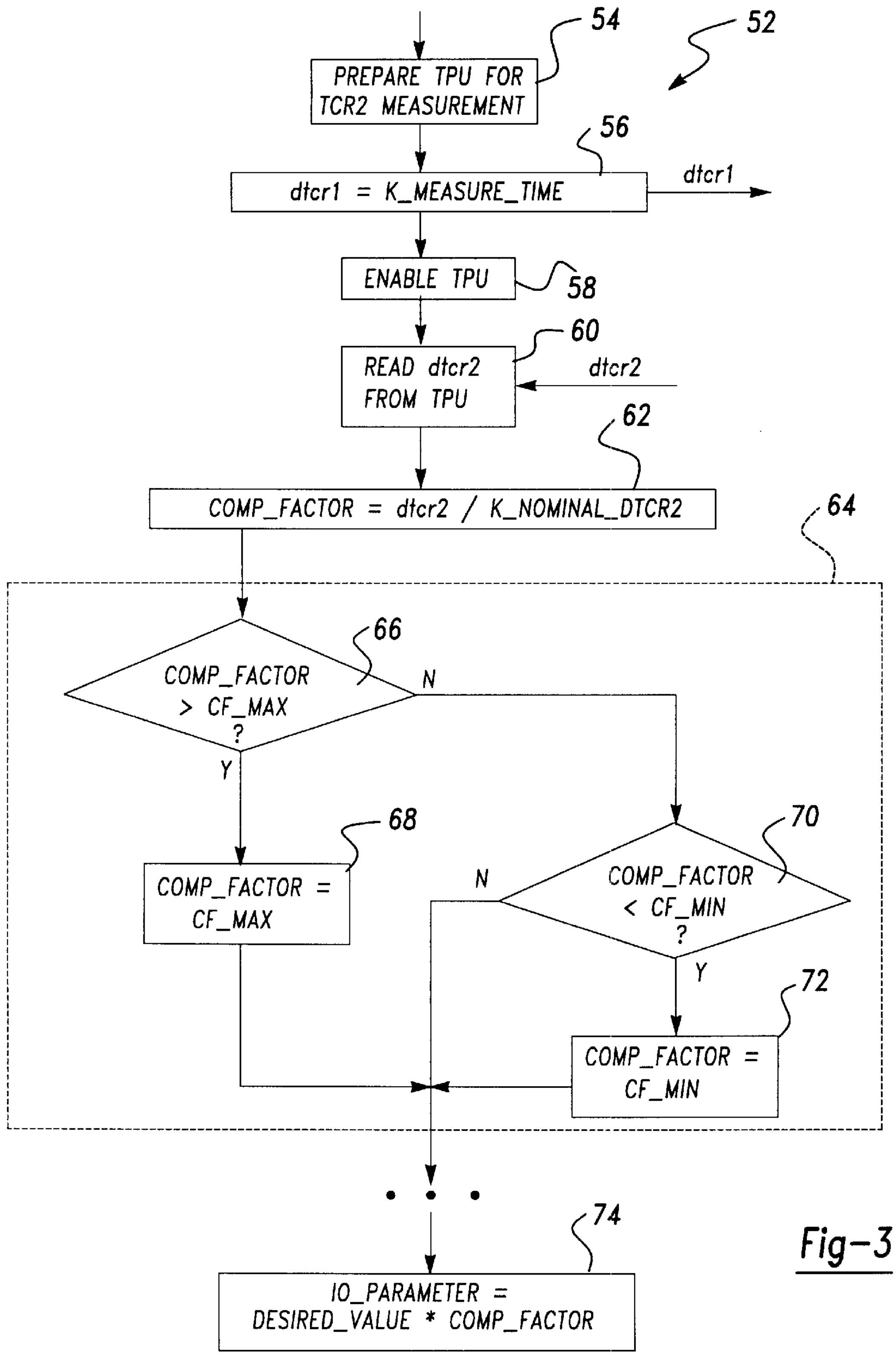
FIG. 3 is a more detailed flow chart diagram illustrating a technique to generate a compensation factor, according to an embodiment of the present invention.

FIG. 3 shows a more detailed flow chart diagram 52 of the operation of the CPU 14 when the algorithm calculates the compensation factor, in accordance with the teachings of the present invention. During initialization of the CPU 14, the TPU 16 is prepared for determining the dtcr2 value measured from the TCR 30, as shown at box 56. The CPU 14 determines the dtcr1 value within the code, and writes this value to a memory to be read by the TPU 16. The dtcr1 value is determined by various factors, such as long term drift of the resonator clock signal 26 and short term jitter of the system clock 24, and is established as a calibration constant K_MEASURE_TIME in the code, as shown at box 56. K_MEASURE_TIME is the time period over which the measurement occurs given in terms of the system clock signal represented in the TCR 28. Once the dtcr1 value is determined, the TPU 16 is enabled, at box 58, to start the operation of the TPU 16.

The dtcr2 value is determined, as discussed above, and this value is read from a location written to by the TPU 16 at box 60. Next, a compensation factor is determined as Comp_Factor=dtcr2/K_NOMINAL_DTCR2, at box 62. K_NOMINAL_DTCR2 is the expected measured time period given in terms of the count value in the TCR 30. To determine the compensation factor, the dtcr2 value in the TPU 16 is compared to the value expected if the resonator 26 was completely accurate. In this example, the expected value is represented by the calibration constant K_NOMINAL_DTCR2. Note that the two calibration constants are related to each other.

Next, an operation is performed at box 64 to determine whether the compensation factor is within certain predetermined limits based on the specified accuracy of the clock signal from the resonator 26. The compensation factor is applied to a decision diamond 66 that determines if the compensation factor is greater than a predetermined maximum value CF_MAX. If the compensation is greater than the predetermined maximum value, then the compensation factor is set to the maximum compensation factor at box 68. If the algorithm determines that the compensation factor is less than the maximum predetermined limit, then the algorithm determines whether the compensation factor is less than a minimum predetermined value CF_MIN at decision diamond 70. If the compensation factor is less than the predetermined minimum value, then the compensation factor is set to the minimum value at box 74. Thus, one of either the actual compensation factor, the predetermined minimum compensation factor, or the predetermined maximum compensation factor is set as the compensation factor. The algorithm applies the compensation factor to any parameter within the operation of the CPU 14 which uses the clock signal from the resonator 26. As shown at box 70, the input/output parameters are set as the desired clock value multiplied by the compensation factor, 10 Parameters=Desired_Value*Comp_Factor.

The following is an example of compensating for a particular input or output, here a bit rate represented in code as Bit_Rate. Bit_Rate is an integer representing the number of clock cycles from the resonator 26 corresponding to one bit of time in the TCR 30, where a bit time is the inverse of the baud rate.

$$\text{Bit\_Rate} = \frac{TCR2_{freq}}{\text{baud rate}} \tag{1}$$

$TCR\mathbf{2}_{freq}$ is the frequency in hertz of the clock signal stored in the TCR 30 and the baud rate is in bits per second.

The CPU 14 uses the algorithm discussed above to keep the baud rate accurate by periodically reading the dtcr2 value, performing the calculation, and updating Bit_Rate using the following relationship.

$$\text{Bit\_Rate} = \frac{f_{system}}{TCR1_{prescaler} * \text{baud rate}} * \frac{dtcr2}{dtcr1} \tag{2}$$

Where $f_{system}$ is the frequency of the system clock and $TCR\mathbf{1}_{prescaler}$ is the scaled system clock count stored in the TCR 28.

The value dtcr1 is set up so that simple calculations can be made on the dtcr2 value to determine a new Bit_Rate. As an example, assume a system clock frequency of 16.8 MHZ and a baud rate of 8192. Using equation (2), the compensated Bit_Rate is then determined as follows:

$$\begin{aligned} \text{Bit\_Rate} &= \frac{16777216}{256 * 8192} * \frac{dtcr2}{dtcr1} \\ &= 8 * \frac{dtcr2}{dtcr1} \end{aligned} \tag{3}$$

Assume the CPU 14 writes a value of 2048 as the dtcr1 value. Then, $$\text{Bit\_Rate} = 8 * \frac{dtcr2}{2048} = \frac{dtcr2}{256} = \frac{dtcr2}{\$100} \tag{4}$$

The CPU 14 can then simply read the dtcr2 value and write its upper byte to Bit_Rate. By using only the upper byte, the accuracy of the used value is further increased. Notice that at this dtcr1 rate, the dtcr2 value will be updated every 31.25 milliseconds.

For another example, assume a system frequency of 21.75 MHZ. Using equation (3):

$$\begin{aligned} \text{Bit\_Rate} &= \frac{21757852}{256 * 8192} * \frac{dtcr2}{dtcr1} \\ &= 10.375 * \frac{dtcr2}{dtcr1} = \frac{83 * dtcr2}{8 * dtcr1} \end{aligned} \tag{5}$$

Assume the CPU 14 writes a value of 64 as the dtcr1 value. Then, $$\text{Bit\_Rate} = \frac{83 * dtcr2}{512} = \frac{83 * dtcr2}{\$200} \tag{6}$$

The CPU 14 reads the dtcr2 value and multiplies it by 83, and then writes the right-shifted value of the upper byte to Bit_Rate. Notice that at this dtcr1 rate, the dtcr2 value will be updated every 753 microseconds.

Each application should determine how often the dtcr2 value needs to be read based upon the rate at which the frequency of the resonator 26 is varying, and upon the jitter of the system clock 24.

To determine the bit time accuracy, the baud rate delivered and detected is calculated as:

$$\text{baud rate} = \frac{TCR2_{freq}}{\text{Bit\_Rate}} \tag{7}$$

This gives a bit time of:

$$\text{bit time} = \frac{1}{\text{baud rate}} = \frac{\text{Bit\_Rate}}{TCR2_{freq}} \tag{8}$$

This bit time is precisely accurate if the synchronization between the TCR 28 and the TCR 30 is not considered. However, the edges of the clock signal from the resonator need to be synchronized to the edges of the system clock signal. Since synchronization of the TCR 30 does occur, the above bit time is accurate to within a synchronization rate. The synchronization rate is represented by:

$$\text{synchronization rate} = \frac{4}{f_{system}} \tag{9}$$

Precisely speaking, the bit time can be determined so that its value will be either one of the two nearest synchronized values, where the synchronized values are some integer (N) multiple of the synchronization rate. The actual bit time would then be one of:

$$\frac{4}{f_{system}} * N \text{ or } \frac{4}{f_{system}} * (N+1) \tag{10}$$

where $$\frac{4}{f_{system}} * N \leq \frac{\text{Bit\_Rate}}{TCR2_{freq}} \leq \frac{4}{f_{system}} * (N+1)$$

For an example, assume a system clock of 21.757952 MHZ, a Bit_Rate value of 244, and a frequency applied to the TCR 30 of 2 MHZ from the resonator 26. Using equations (8) and (9):

$$\text{Bit time} + \frac{244}{2000000} = 122.000 \text{ microseconds} \tag{11}$$

$$\text{synchronization rate} = \frac{4}{2175952} = 183.841 \text{ nanoseconds}$$

The actual bit time for N=663 will be either:

$$\text{actual bit time} = \frac{4}{21757952} * 663 = 121.886 \text{ microseconds} \tag{12}$$

or $$\text{actual bit time} = \frac{4}{21757952} * 664 = 122.070 \text{ microseconds}$$

In this example, the desired baud rate is 8192, which is a bit time of 122.070 microseconds. As the above values show, the accuracy of the serial communication interface's bit time is −183.841 nanoseconds.

In general, the accuracy of the resonator 26 is much less than the accuracy of the system clock 24. Consider a clock signal applied to the TCR 30 of 2 MHZ from the resonator 26 with an accuracy of 2 percent. If the clock signal was plus two percent, an unadjusted bit time would be:

$$\text{bit time} = \frac{244}{2040000} = 119.608 \text{ microseconds} \tag{13}$$

$$\text{actual bit time} = 119.497 \text{ or } 119.681 \text{ microseconds}$$

Using this method of compensating, a value of 249 is calculated for Bit_Rate. With an adjustment to Bit_Rate, the actual bit time would be the same as with a nominal resonator input:

$$\text{bit time} = \frac{249}{2040000} = 122.059 \text{ microseconds} \tag{14}$$

$$\text{actual bit time} = 121.886 \text{ or } 122.070 \text{ microseconds}$$

Without compensation, the output error would have been 2%.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

The embodiments of the invention in which an exclusive property or privilege is claimed are defined as follows:

1. A method of accurately controlling an output device in a system where a timed control signal for the device is generated in accordance with a time-related control parameter developed by the system, utilizing a control clock signal having an actual clock frequency that tends to drift from a rated clock frequency, said method comprising the steps of:

establishing a predetermined time period;

determining a control clock count based on the number of cycles of the control clock signal during the time period;

determining the actual clock frequency of the control clock signal based upon the clock count over the time period; and adjusting the time-related control parameter based upon the difference between the determined actual clock frequency and said rated clock frequency, and generating the timed control signal based on the adjusted control parameter, so as to compensate the operation of the output device for drifting in frequency of said control clock signal.

2. The method according to claim 1 wherein the step of determining a clock count includes the step of applying the control clock signal to a time capture register that generates the clock count of the clock cycles, said time capture register determining edge information of the control clock signal.

3. The method according to claim 1 wherein the step of determining a predetermined time period includes establishing a predetermined time period that is programmable.

4. The method according to claim 1 wherein the clock signal is a clock signal generated by a resonator in a powertrain control module associated with a vehicle.

5. The method according to claim 1 wherein the step of adjusting the time-related control parameter includes the steps of: generating a compensation factor based upon the difference between the determined actual clock frequency and said rated clock frequency, determining whether the compensation factor is between a predetermined maximum compensation factor and a predetermined minimum compensation factor, and setting the compensation factor to the predetermined maximum compensation factor if the compensation factor is greater than the maximum compensation factor and setting the compensation factor to the predetermined minimum compensation factor if the compensation factor is less than the minimum compensation factor, and otherwise using the compensation factor determined.

6. The method according to claim 1 wherein the step of determining the clock count during the time period includes the steps of providing a first time capture register that generates a clock count of a system clock signal, providing a second time capture register that provides the clock count of the control clock signal, and sending a signal from the first time capture register when the predetermined time period expires to cause the second time capture register to output the clock count of the control clock signal.

7. The method according to claim 1 wherein the timed control signal is used in a powertrain control module to control one of the group consisting of spark dwell and placement, fuel pulse-width and placement and communication protocol bit timing.

8. The method according to claim 1 further comprising the step of providing a system clock signal, wherein the step of establishing a predetermined time period includes establishing the predetermined time period based on the system clock signal.

9. A method of generating a timed control signal representative of a time-related control parameter using a control clock signal having an actual clock frequency that tends to drift from a rated clock frequency, comprising the steps of:

providing a system clock signal;

determining a control clock count based on the number of cycles of the control clock signal;

determining a system clock count based on the number of cycles of the system clock signal;

establishing a predetermined time period in terms of the system clock signal;

determining the actual clock frequency based upon the control clock count over the time period; and adjusting the time-related control parameter based upon the difference between the determined actual clock frequency and said rated clock frequency, and generating the timed control signal based on the adjusted control parameter, whereby said timed control signal is compensated for drifting in frequency of said control clock signal.

10. The method according to claim 9, wherein the step of adjusting the time-related control parameter includes the step of generating a compensation factor based upon the difference between the determined actual clock frequency and the rated clock frequency.

11. The method according to claim 10 where the step of generating a compensation factor includes the steps of determining whether the compensation factor is between a predetermined maximum compensation factor and a predetermined minimum compensation factor, and setting the compensation factor to the predetermined maximum compensation factor if the compensation factor is greater than the maximum compensation factor and setting the compensation factor to the predetermined minimum compensation factor if the compensation factor is less than the minimum compensation factor, and otherwise using the compensation factor determined.

12. The method according to claim 9 wherein the step of determining the control clock count includes providing a first time capture register that generates a clock count of the control clock signal, and the step of determining the system clock count includes providing a second time capture register that generates the system clock count.

13. The method according to claim 9 wherein the control clock signal is generated by a resonator in a powertrain control module associated with a vehicle and the system clock signal is a crystal in the powertrain control module.

14. The method according to claim 13 wherein the timed control signal is used to control one of the group consisting of spark dwell and placement, fuel pulse-width and placement and communication protocol bit timing.

15. A system for providing a timing signal representative of a time-related control parameter using a control clock signal having an actual clock frequency that tends to drift from a rated clock frequency, said system comprising:

a clock signal generating device that generates a system clock signal;

a time capture register responsive to the control clock signal and providing a control clock count based on the number of cycles in the control clock signal; and a processing system for determining a time period based on the system clock signal, for determining the actual clock frequency based on the control clock count over the determined time period, and for adjusting the time-related control parameter based upon the difference between the determined actual clock frequency and said rated clock frequency, and generating the timing signal based on the adjusted control parameter, whereby said timing signal is compensated for drifting in frequency of said control clock signal.

16. The system according to claim 15 wherein the processing system generates a compensation factor based on the difference between the actual clock frequency of the control clock signal and the rated clock frequency of the control clock signal.

17. The system according to claim 15 wherein the processing system is part of a time processor unit associated with a powertrain control module and a vehicle.

18. The system according to claim 16 wherein the processing system generates the compensation factor such that the processing system determines whether the compensation factor is between a predetermined maximum compensation factor and a predetermined minimum compensation factor, and sets the compensation factor to the predetermined maximum compensation factor if the compensation factor is greater than the maximum compensation factor and sets the compensation factor to the predetermined minimum compensation factor if the compensation factor is less than the minimum compensation factor, and otherwise using the compensation factor determined.

* * * * *